June 13, 1967 J. F. McCREERY 3,324,529
SLIDE ADJUSTMENT
Filed Dec. 9, 1965
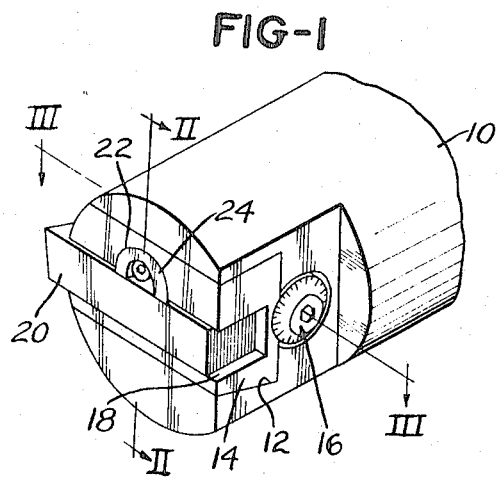
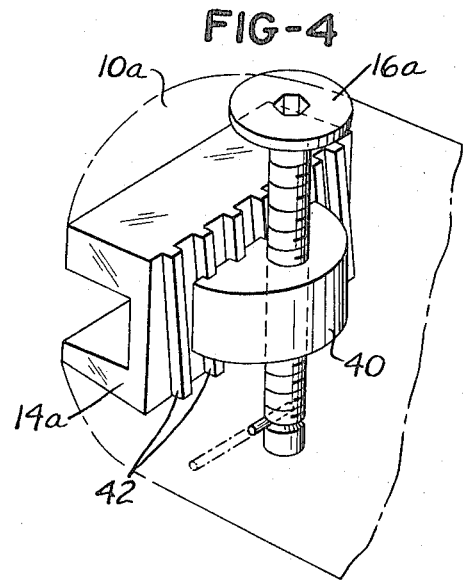
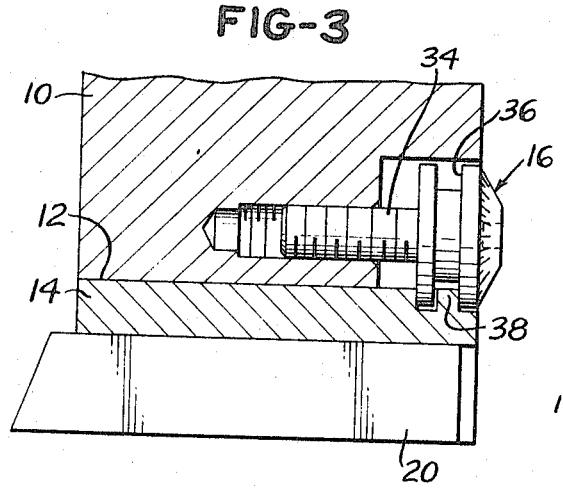
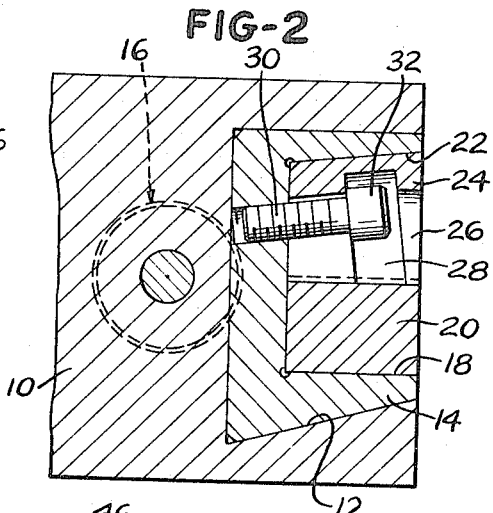
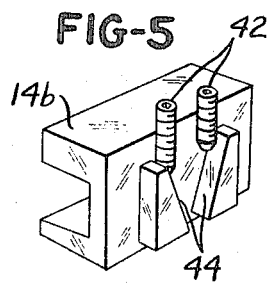
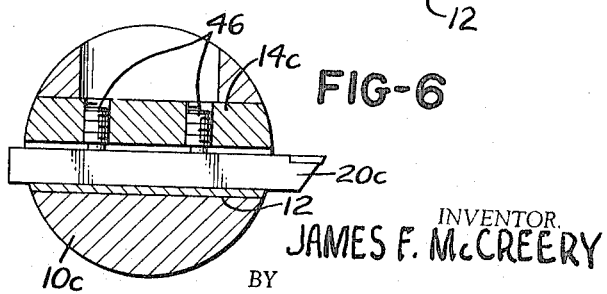
INVENTOR.
JAMES F. McCREERY
BY
Melvin A. Crosby 3,324,529
SLIDE ADJUSTMENT
James F. McCreery, Latrobe, Pa., assignor to Kennametal, Inc., Latrobe, Pa., a corporation of Pennsylvania
Filed Dec. 9, 1965, Ser. No. 512,706
6 Claims. (Cl. 29—96)

This invention relates to cutting tools and is particularly concerned with a cutting tool consisting of a cutting element and a holder therefore with improved means for adjusting the cutting element in the holder and clamping it in place.

Cutting tools comprising holders and cutting elements adjustably mounted therein are known and are widely used in machine tools. Heretofore, precision adjustment of the cutting elements in the holder has not been particularly critical and adjustments in the tool setting have been made after placing the cutting tool in the machine. More recently, a great many machine tools, such as lathes and the like, have been equipped with programming devices, such as perforated tapes, and control the movement of the cutting tool and workpiece relatively to produce the finished workpiece. With such numerical control arrangements, the particular setting of the cutting element in the holder is extremely important.

With a numerical controlled arrangement it becomes important to be able to set the cutting element in the holder with precision and with rapidity and, furthermore, it is important to be able to preset the cutting element in the holder before the cutting tool is placed in the machine in which it is to be used. With all heretofore known clamping elements for clamping the cutting element in the holder, it has been the case that the cutting element has tended to shift in the holder when the clamping means was tightened up. Many devices, such as ball point clamp screws and the like have been tried, but the cutting element will still tend to shift, and in a somewhat erratic manner, when the clamping means is tightened up.

With the foregoing in mind, it is a particular object of the present invention to provide a clamping arrangement for clamping an adjustable cutting element in the holder therefor in such a manner that the cutting element will not shift when the clamping thereof in the holder is effected.

Another object of this invention is the provision of a tool and a cutting element therein in which the cutting element is adjustable in the tool holder and can be clamped therein without any shifting after the adjustment has been effected.

A still further object in the present invention is the provision of a relatively inexpensive arrangement for accomplishing the objects referred to above.

The foregoing objects as well as still other objects and advantages of the present invention will become more apparent upon reference to the following detailed specification taken in connection with the accompanying drawings in which;

FIGURE 1 is a perspective view showing a portion of a cutting tool and illustrating a holder and the cutting element which is adjustably mounted therein;

FIGURE 2 is a vertical sectional view indicated by line II—II on FIGURE 1;

FIGURE 3 is a plan sectional view indicated by line III—III on FIGURE 1;

FIGURE 4 shows an adjustment in connection with the cutting tool;

FIGURE 5 shows a modified type of adjustment for the cutting tool; and

FIGURE 6 is a sectional view showing a modified clamping arrangement for clamping the cutting element in the holder.

Referring to the drawings somewhat more in detail, in FIGURE 1, 10 indicates a holder such as for a boring bar. This member may be entirely of steel or it may consist of a cemented tungsten carbide shank with a machinable steel head thereon. The head end of the holder 10 is provided with a transverse groove 12 which may be, as illustrated, of a somewhat dove-tailed configuration. Slidably mounted in groove 12 is a slide 14 which is adjustable within the groove by any suitable micrometer adjustment means such as indicated generally at 16 and examples of which will be described hereinafter.

Slide 14 is provided with a groove 18 for receiving a cutting element 20. Cutting element 20 may be of any well known type and may consist of a steel shank with a cemented tungsten carbide tip, for example.

The slide 14, as will be seen in FIGURES 1 and 2 is provided with an inclined semi-circular recess 22 in which a clamp member 24 of corresponding shape is disposed. Such a clamping arrangement is illustrated in the copending Carlstedt et al. United States application, Ser. No. 505,896, filed Nov. 1, 1965, and entitled Clamp Member.

The clamp member 24 has a U-shaped notch 26 therein extending axially therethrough and which is interrupted between the top and bottom of the clamp member by the groove 28. Notch 26 is adapted for receiving the shank 30 of a clamp screw which has a head 32 disposed in groove 28. In either direction of movement of the clamp screw the clamp member 24 will be positively moved. The threaded shank 30 of the screw threads in a threaded bore in slide 14 and thus the clamp member can be moved in either axial direction in recess 22 and thereby be moved into and out of clamping engagement with cutting element 20.

As will be seen in FIGURE 3 the adjusting means 16 may take the form of a screw 34 threaded into a threaded bore in holder 10 and with the screw having a groove 36 in the head engaging a key portion or finger 38 formed on slide 14. It will be evident that rotation of adjusting means will cause slide 14 to move laterally in holder 10 thereby effect lateral adjustment of cutting element 20 in the holder.

The slide 14 is a relatively close fit in groove 12 but it is nevertheless relatively freely moveable therein in the direction of the length of the slide. The cutting element 20 is, of course, freely moveable in groove 18 of the slide.

In operation, the cutting element 20 is placed in groove 18 of the slide and clamp member 24 is then drawn down until the cutting element is held tightly in the slide. At this time, slide 14 is still freely moveable in groove 12 by availing of adjusting means 16.

The position of the cutting element 20 in its groove 18 is so selected that the cutting element is close to its diresired position of adjustment. The final precision adjustment of the cutting element, which can be accomplished by gauge means or the like, is effected by availing of adjusting means 16 which, when rotated will cause movement of slide 14 in groove 12. At this time, the cutting element, which is gripped in the slide, will move together with the slide and the cutting element can thereby be moved to the exact desired position.

When the cutting element has reached the precise position to which it is to be moved, the clamp member 24 is further tightened up and this will effect lateral expansion of slide 20 into gripping engagement with the sides of groove 12. It will be apparent that the slide 14 will merely expand and that all clamping forces are developed within the slide itself so that there is no tendency for the slide to move in the axial direction in its groove 12 as would be the case if the slide were clamped by clamping screws carried by the holder and bearing on the slide. Instead, the slide is clamped up tight in the holder without any movement whatsoever and, since the cutting element is already clamped in the slide, the final clamping up is effected without any movement whatsoever of the cutting element itself.

It has been found by test and experimentation that the proposed clamping arrangement wherein the cutting element is first clamped in the slide, and then the slide is expanded into final clamping engagement with the holder, results in the possiblity to effect precise presetting of the cutting element in the holder so that it is possible to preset tools outside a machine and then to place them in the machine and obtain reliable results.

It is furthermore possible, with a tool mounted in a machine, to employ gauges and the like and to effect setting of the cutting element therein and obtain reliable results. It will be evident that considerable time saving is effected because it is not necessary to turn workpieces and effect multiple measurements of the workpiece and adjustments of the cutting element in order to obtain the desired results. The time lost on a machine for setting of tools therein is thus greatly reduced and superior results can be obtained with the use of the reliable non-shifting cutting element clamping arrangement according to the present invention.

FIGURE 4 shows a modified arrangement for adjusting the slide wherein the adjusting means, indicated at 16a, is accessible from the top of the holder 10a. The adjusting means 16a comprises a screw on which a block 40 is threaded which has inclined teeth on one side which engaged inclined teeth 42 on the back of the slide 14a. Rotation of the adjusting screw will move block 40 vertically in the holder and in this manner adjust slide 14a laterally in the holder. The same clamping means as previously described can be employed for locking the cutting element in the slide and for also locking the slide in the holder.

FIGURE 5 shows schematically how a pair of set screws 42 can be utilized bearing on respective inclined surfaces 44 on the back of slide 14b for effecting lateral adjustment of the slide in the supporting holder therefore.

FIGURE 6 shows how, instead of the clamp member 24, there could be provided a pair of set screws 46 threaded through the upper wall of slide 14c and bearing on the cutting element 20c. The screws 46 are availed of for first clamping the cutting element 20c in the slide 14c. The slide 14c is then adjusted in the holder in any desired manner, by an suitable sort of micrometer device, till the cutting element is precisely located relative to the holder. The screws 46 are then further tightened and this will effect expansion of slide 14c in its groove and thereby fix the slide in the holder without movement thereof while simultaneously the fixing of the tool in the slide is made even more secure and is effected without any shifting of the cutting element in its supporting slide.

It will be evident from the foregoing that the fit of the cutting element supporting slide in the holder is of such a nature that the first effect of the clamping means is to fix the cutting element in the slide while at the same time the slide remains free to move in the holder. Further tightening of the clamping means will then expand the slide into gripping engagement with the holder while making the cutting element even more secure within the holder but not effecting any shifting of the cutting element in the slide.

It will be apparent that the slide is preferably dove-tail in configuration, or at least inclined on one side so that the slide is captive in the holder and also so that the expansion of the slide within the holder will tend to seat the slide in a predetermined position in the holder. It is conceivable however that the groove in which the slide is moveable could be rectangular so long as the slide were prevented from moving outwardly in its groove during clamping thereof. The forming of the slide to at least a semi-dove-tail configuration, however, is simple and does not involve any added expense and is therefore the one to be preferred in this particular application of the novel clamping means of the present invention.

It will furthermore be evident that while the novel clamping means is illustrated in connection with a cutting element and the holder therefore, such as a boring bar of a machine tool, other applications of the invention are possible in which precision adjusting of a member such as a cutting element or the like is desired.

It will be understood that this invention is susceptible to modification in order to adapt it to different usages and conditions; and accordingly, it is desired to comprehend such modifications within this invention as may fall within the scope of the appended claims.

What is claimed is:

1. In combination, a first member, a second member adjustable on the first member, first means for adjusting said second member on said first member to precisely predetermined positions thereon, and second means for clamping said second member to said first member in said adjusted positions without any shifting of said members relatively, said first means including a slide substantially U-shaped in cross section and having said second member disposed between the legs thereof and a groove formed in said first member in which said slide is disposed, said second means including clamp means carried by at least one leg of said slide, said clamp means being operable upon adjustment in clamping direction first to clamp said second member to said slide and second to expand said slide in said groove to press the legs of the slide against the sides of said groove thereby to clamp said slide to said first member.

2. The combination according to claim 1 in which said slide is captive in said groove except with respect to longitudinal movement of the slide in the groove.

3. The combination according to claim 1 in which said groove has a greater dimension laterally at the bottom than at the open side thereof and the outer contour of said slide conforms to the contour of the groove.

4. The combination according to claim 1 in which said clamp means comprises a recess on the inside of one leg of said slide, a clamp element in said recess, and means engaging said clamp element and screw threaded into said slide to force said clamp element toward said second member to clamp said second member against the other leg of the slide while simultaneously urging the legs of said slide away from each other.

5. The combination according to claim 1 in which said clamp means comprises screw means threaded through one leg of said slide adapted to engage said second member, and an aperture in said first member communicating with the said groove and providing access to said screw means.

6. The combination according to claim 1 which includes interengaged elements of micrometer adjusting means on said slide and on said first member for effecting fine adjustment of said slide on said first member before the slide is clamped to said first member.

No references cited.

WILLIAM W. DYER, JR., *Primary Examiner.*

H. HINSON, *Assistant Examiner.*